US011182744B2

United States Patent
Nittala et al.

(10) Patent No.: US 11,182,744 B2
(45) Date of Patent: Nov. 23, 2021

(54) CONTAINERIZED CONTEXTUAL CONVERSATION SYSTEM

(71) Applicant: AIRWATCH LLC, Atlanta, GA (US)

(72) Inventors: Gangadhar Nittala, Bangalore (IN); Ramani Panchapakesan, Bangalore (IN); Arjun Kochhar, Bangalore (IN); Saurabh Agrawal, Bangalore (IN); Akshay Laxminarayan, Bangalore (IN); Ilanchezhian Kuppusamy, Bangalore (IN)

(73) Assignee: AirWatch, LLC, Atlanta, GA (US)

( * ) Notice: Subject to any disclaimer, the term of this patent is extended or adjusted under 35 U.S.C. 154(b) by 559 days.

(21) Appl. No.: 15/265,887

(22) Filed: Sep. 15, 2016

(65) Prior Publication Data

US 2017/0344949 A1 Nov. 30, 2017

(30) Foreign Application Priority Data

May 26, 2016 (IN) .............................. 201641018141

(51) Int. Cl.
*G06Q 10/10* (2012.01)
*H04L 29/06* (2006.01)
*G06Q 50/00* (2012.01)

(52) U.S. Cl.
CPC ........... *G06Q 10/101* (2013.01); *G06Q 50/01* (2013.01); *H04L 63/104* (2013.01); *H04L 63/105* (2013.01); *G06Q 2220/10* (2013.01)

(58) Field of Classification Search
None
See application file for complete search history.

(56) References Cited

U.S. PATENT DOCUMENTS

| | | | | |
|---|---|---|---|---|
| 6,624,826 B1* | 9/2003 | Balabanovic | ......... | G06F 3/0481 707/E17.009 |
| 9,807,135 B1* | 10/2017 | Hansen | ................ | G06F 3/0482 |
| 2009/0094530 A1* | 4/2009 | Champlain | .......... | G06Q 10/087 715/752 |
| 2012/0151383 A1* | 6/2012 | Kazan | ..................... | G06F 3/048 715/753 |
| 2013/0097481 A1* | 4/2013 | Kotler | ................. | G06F 3/04842 715/230 |
| 2013/0159830 A1* | 6/2013 | Lee | ..................... | G06F 17/2241 715/208 |
| 2014/0304836 A1* | 10/2014 | Velamoor | ............... | H04L 63/08 726/28 |
| 2016/0055343 A1* | 2/2016 | Coard | ..................... | G06F 21/31 726/7 |

* cited by examiner

*Primary Examiner* — Andrew B Whitaker
(74) *Attorney, Agent, or Firm* — Clayton, McKay & Bailey, PC

(57) ABSTRACT

Systems herein include a managed content application that can place markers for conversations within secure documents. A separate social application can serve as the platform for the conversations, allowing for efficient conversations that can occur in real time. The markers can be stored with the documents and identify the conversation, allowing users to retrieve historical conversations that occurred on the social application from within the document. This can allow users to quickly come up to speed without having to rehash the conversations with the original participants. Document security can also be maintained without sacrificing conversation efficiency of the social application.

19 Claims, 9 Drawing Sheets

```
{
  "TYPE": "SOCIALCAST",                   — 310
  "PAGE": "<PAGENUM>",                    — 320
  "ID": "<UNIQUE ID>",                    — 330
  "PAGETEXT": "<TEXT>",                   — 340
  "ANNOTATIONBOUNDRY": {                  — 350
      "TOPLEFT": "<TOPLEFT(X AND Y) OF THE ANNOTATION>",
      "BOTTOMRIGHT": "<BOTTOMRIGHT(X AND Y) OF THE ANNOTATION>",
  },
  "PAGEBOUNDRY": {                        — 360
      "TOPLEFT": "<TOPLEFT(X AND Y) OF THE CONTEXTUAL CONVERSATION>",
      "BOTTOMRIGHT": "<BOTTOMRIGHT(X AND Y) OF THE CONTEXTUAL CONVERSATION>",
  }
}
```
— 300

CONTAINERIZED CONTEXTUAL CONVERSATION SYSTEM

RELATED APPLICATION

Benefit is claimed under 35 U.S.C. 119(a)-(d) to Foreign Application Serial No. 201641018141 filed in India entitled "CONTAINERIZED CONTEXTUAL CONVERSATION SYSTEM", filed on May 26, 2016, by AIRWATCH LLC, which is herein incorporated in its entirety by reference for all purposes.

BACKGROUND

Enterprises are seeking ways to increase workplace collaboration without sacrificing document security. To keep documents secure, enterprise mobility management solutions can include a managed application to open work documents from an enterprise server. Using the managed application, a user can leave comments within a document and save the document back to the server. But these comments are not part of a fluid conversation. Instead, each user must serially open the document within the managed environment, leave comments, and save the document back to the server. Document security is maintained but collaboration efficiency can suffer.

Increasingly, workforce collaboration occurs through potentially unsecured conversation platforms, such as instant messaging, email, and social networks. Because of security risks, the document being discussed is usually not directly part of the unsecured conversation. The conversation takes place separately from the context of the document being discussed, effectively sacrificing context for security. At best, a user can type "look at page 2" or something similar to try to provide some context for the conversation.

Additionally, conversations that exist separately from the document are ultimately lost. When a new member joins the team, they have no way of coming up to speed on these conversations. Instead, they must waste valuable time holding the same conversations again with many of the same users that were involved in the original conversation.

For at least these reasons, a need exists for systems that contextually link unsecured conversations with secure documents.

SUMMARY

It is to be understood that both the foregoing general description and the following detailed description are exemplary and explanatory only and are not restrictive of the examples, as claimed.

An example system can include a management server that performs functions of an enterprise mobility management solution. For example, the management server can store user permissions to determine which users can access managed documents. The management server or an application server can send a content application to a user device for installation. The content application can allow the user to access secure documents that are maintained by the enterprise. For example, the documents can be encrypted for local storage on the user device such that they can only be opened by the content application or other managed applications. By restricting the document to the content application and the management server, the environment can be considered "containerized" by encrypting the documents at rest, in transit, and during access.

The containerized enterprise documents can be accessed and edited from within the content application and other managed applications, but may be inaccessible by non-managed applications. The documents can remain encrypted in a content application container at the user device for localized access. In one example, a viewer application can open and view the encrypted document from within the local container. The viewer application and the container can be considered part of the content application for purposes of this disclosure.

The content application can allow the user to contextually converse with other users about the secure document through use of a separate social application that can be unsecured. A social application can be a conversation platform that is not containerized, such as FACEBOOK, or an enterprise conversation platform, such as SOCIALCAST. Conversations in the social application can be unencrypted locally and generally are not limited to use by only the content application. Instead, conversations can be accessed through a web browser at a public website in an example. Other social applications can be managed applications, but still might not limit access to the conversations only to the management server and managed applications.

First, the content application can open a document based on the management server determining that the user permissions allow the user device to access the document. Using the content application, a user can place a marker within the document. The marker can identify context for a conversation, such as one or more words or areas within the document. The marker also serves the purpose of anchoring the conversation to the document for future review, ensuring that conversations on an outside social platform are not lost.

Placing the marker can cause the content application to prompt the user to identify a user or user group for including in the conversation, and allow the user to include a message regarding the marked context. The content application then sends a request to a social application to launch the conversation. The request can be an HTTP command, uniform resource locator ("URL"), Application Programming Interface ("API") procedure call, or other mechanism to cause the social application to post a conversation to the identified users within the social application.

From there, users can converse normally within the social application, building a thread of conversation that relates to the marked portion of the document. Alternatively, the conversation can take place within a window in the content application, where the user can simultaneously view the secure document and unsecure conversation. The conversation can be tracked and stored by a backend portion of the social application, such as on a conversation server. The social application can utilize a conversation identifier to reference the conversation, which can include the comments made by the various users privy to the conversation. When the conversation is created, the content application can supply a link to the marker (which can generally include a link to the document), allowing conversation participants to quickly retrieve the document using their own user devices and managed content applications.

Meanwhile, the management server can securely store the document and marker within the enterprise environment, keeping them containerized. The marker can include the conversation identifier, allowing the document to retain a link to the conversation. The management server need not store the conversation itself, and instead the management of the conversation can remain with the social application. In one example, the markers are stored locally an encrypted database of the content application, such as in the container, before being synchronized with the management server.

Upon receiving selection of the marker, the content application can send a request to the social application to retrieve the conversation. For example, the content application can supply the conversation identifier to the social application. This can allow the social application to retrieve and display the conversation. In one example, the content application displays the conversation from the social application within a window of the content application. This can allow the user to see both the document and the related conversation all in one place.

Such a system can allow users to efficiently converse within the context of a secure document while also taking advantage of a secure or potentially unsecured social application. This can allow for more efficient conversation without sacrificing document security in an enterprise mobility environment. Conversations can happen without providing the entire document to the unsecured social application environment. And because the content application can later recall the conversations from the social application, historical discussions are not lost and users can quickly come up to speed without rehashing the same conversations. In addition, because the comments are not embedded within the document itself, multiple users can simultaneously comment on portions of the document in a conversation and have those comments automatically linked to the relevant document portions through the marker.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for collaborating regarding a managed document using a social application without compromising document security. The managed document can be opened with a content application that executes on a user device. The content application can be a managed application that accesses enterprise documents based on permissions at a management server. Locally stored versions of the document can be encrypted so that only the content application or other managed applications can open it, keeping the document "containerized."

Although the document remains containerized, a user can start a conversation about the document in the separate social application. To do this, the user can place a marker in the document, using the content application, which can trigger a new conversation in the social application. The conversation can be managed by a conversation server outside of the containerized environment of the content application and other managed applications. However, the marker can retain a first link to the conversation, and the conversation can retain a second link to the marker. This can allow authorized users to access the secure or unsecure conversation from the secure document, without compromising the document security. Likewise, a conversation participant can access the document being discussed, provided that they have the requisite permissions at the management server that keeps the document secure.

By linking the document to a conversation (or vice versa), historical discussions can be preserved and recalled. In one example, the marker includes a conversation identifier used by the social application to identify and retrieve the conversation. This can allow users who view the document to recall the conversation within the social application. For example, when a user clicks the marker within the document, the social application can use the conversation identifier to retrieve the conversation from the conversation server.

Markers and documents can remain containerized and stored within the enterprise environment by the management server. The conversations can be separately managed and stored by a conversation server and need not be containerized or secure. In this way, the managed content application can leverage a social application to discuss a secured document without compromising the security of the document. This allows for increased collaborative efficiency while maintaining document security.

Figure 1:
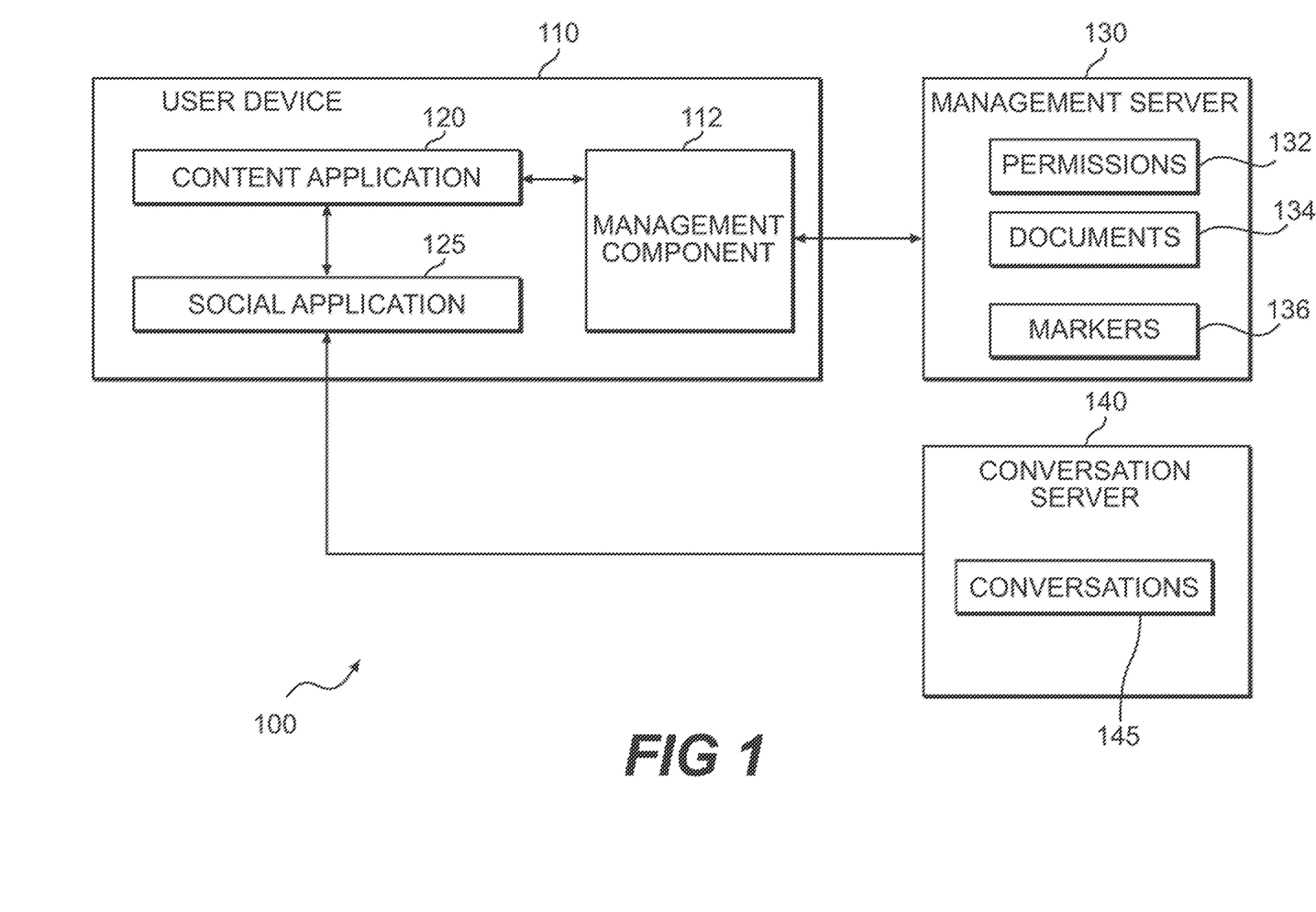
FIG. 1 is an exemplary illustration of system components.

FIG. 1 illustrates an exemplary system 100 for a contextual conversation within a containerized document. A user device 110 can be any computing device, such as a cell phone, laptop, tablet, personal computer, or workstation. The user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. The user device 110 can be a personal user device that is owned by the user rather than an enterprise. The user device 110 can alternatively be a corporate or enterprise-owned device.

A management server 130 can manage the user device 110 and other user devices in a workplace or other enterprise environment. To do so, the user device 110 can complete an enrollment process with the management server 130. After a user device 110 has enrolled, the management server 130 can initiate installation of one or more managed applications on the user device 110. The managed applications can access enterprise information based on permissions 132 stored at the management server 130. To maintain security of enterprise information, the management server 130 can control aspects of the managed applications used to carry out enterprise activities. For example, data leak protection settings can be established by an administrator and enforced by management component 112. Examples of data leak protections include disabling the ability to copy and paste from a managed content application 120 into an unmanaged application, and disabling printing.

The management server 130 can use stored permissions 132 to determine the rights of each user device 110 within the enterprise environment. For example, the permissions 132 associated with the user device 110 can control which file repositories the user device 110 can access. The permissions 132 can also control which managed applications the user device 110 can use and, in one example, what functionality is available within those applications. The specific permissions 132 assigned to a user device 110 can be based on user characteristics, geographical characteristics, and user device 110 characteristics. Some or all of this information can be collected during enrollment. For example, a user profile can specify a user group to which the user device 110 belongs. Example user groups can include software developers and executives. In one example, an administrator user can associate a user with a user group, and subsequent enrollment of the user device 110 can assign permissions 132 and managed applications to the user device 110 according to the user group. Different permissions 132 can also be assigned to a user device 110 at different times. For example, different permissions 132 can be assigned based on where the user is located, such as different office locations. These permissions 132 are stored at the management server 130 in an example.

In the example of FIG. 1, the content application 120 can be a managed application installed on the user device 110. The content application 120 can access enterprise documents at the management server 130 or at a repository specified by the management server 130. The content application 120 can retrieve documents from the repository and store them in a local encrypted database on the user device 110. The content application 120 can also include any type of application that accesses enterprise documents, such as a word processor, viewer, document creation or editing tool, email client, media player, or any other program. In one example, those applications can open the document from the local database of the content application 120. The term "content application" 120, therefore, can refer to multiple different applications, singularly or together, in some examples. The term "document" also does not limit the examples to any particular file type, and can include media files such as pictures, video, or audio.

In one example, the management server 130 can interact with the content application 120 through use of a management component 112 that executes on the user device 110. The management component 112 can be installed during enrollment with the management server 130. The management component 112 can include a device-level component, such as an API, agent application, hypervisor, or virtualized device, and an application-level component, such as an API, software development kit ("SDK"), application wrapper, or workspace agent application. The device-level management component can include system-level privileges. The application-level management component can include privileges in managed applications, which can be developed for operation with the management server 130. Reference to the management component 112 is understood to include either or both of the device-level and application-level components unless otherwise specified.

The management server 130 can interact with the management component 112 with calls to an application (i.e., application level) or the operating system (i.e., device level) of a user device 110. In one example, based on permissions 132, the management server 130 can turn functionality on and off within the managed application(s) through calling subroutines in the management component 112. If the permissions 132 specify it, the management server 130 can turn off functionality at the user device 110, such as printing, emailing, or Internet access. This can allow for added security when viewing, editing, or conversing about particularly sensitive documents.

The content application 120 can initiate conversations within a document. In one example, a graphical user interface ("GUI") can include an option to place a marker within the document. The marker can be placed to cover text, images, or other document portions that the user wants to discuss. A graphical indicator can indicate the portion of the document that is linked to a conversation. Multiple markers can be placed within a document in an example.

Upon placement of a marker, the content application 120 can send a message to a separate social application 125 to initiate the conversation. A conversation can include a thread of textual, audio, or video commentary by users that are participants in the discussion. The social application 125 can organize and manage the conversation thread. In one example, the content application 120 provides a text interface to type a message that is sent to the social application 125 to initiate the conversation. Based on a marker being placed, the content application 120 can prompt the user to enter a comment and identify at least one user to notify of the conversation. This can include using nomenclature understood by the social application 125, or providing a list of friends from the social application 125 from which the user can make selections. The social application 125 can be sent the identified participants as part of the request to initiate the conversation. A conversation server 140 can track users and conversations 145 for the social application 125. In another example, the content application 120 initiates the conversation 145 by sending a message directly to the conversation server 140. The conversation server 140 can notify the participants of the existence of the conversation 145, such as by sending a private message or by posting in their personal news feed.

In one example, a user group can be identified for participation in the conversation 145. As members of the user group change over time, those members that are currently in the group can be granted access to the conversation by the social application 125. User groups can be tracked and managed at a conversation server 140 in an example.

In another example, the management server 130 can track which user names in the social application 125 correspond to users stored in the management server 130. When a user places a marker, they can identify a user group in the management server 130 to which the conversation 145 pertains. The management server 130, in turn, can provide the respective user names to the social application 125 for inviting users to participate in the conversation 145. The management server 130 can also control future access to the conversation 145 from within the content application 120 by first checking that a user belongs to the user group associated with the marker before requesting the social application to retrieve the conversation 145.

The user can also identify a private chat room for holding the conversation 145. The marker can store the chat room credentials for future access in an example. In another example, the users separately store the credentials to the private chat room.

The management server 130 can cause the document to automatically download to the user devices of the participants for viewing in the containerized content application 120. In one example, the management server 130 interacts with the management component 112 of the respective user devices 110 to facilitate the download.

The participants can be notified of the marker in multiple ways. First, upon opening the document, the document itself can include a callout notifying the user of the marker. Selecting the callout can take the user directly to the marker and retrieve the conversation 145 in the social application 125. This allows the participant to avoid having to scroll through the document. Additionally, the content application 120 can include a window for displaying the conversation 145 from the social application 125 simultaneously with the document at the marker location. The window can also allow the participant to respond in the conversation 145, which sends the reply to the conversation server 140 for inclusion in the social application 125.

A second notification mechanism can occur in the social application 125 itself. As part of initiating the conversation 145, the content application 120 can send a marker address to the social application 125. This can include sending a document link, such as a URL, to the social application. The social application 125 can post the marker address as a comment in the conversation thread so that users who join the conversation 145 can access the document or document portion that the conversation 145 is about. Similarly, the social application 125 can send a conversation identifier to the content application 120 so that the marker can link to the conversation 145.

In another example, the content application 120 can determine whether to send a marker address to the social application 125 based on a document security level or user permissions 132. For example, a document with a high security level relative to other documents can be deemed too sensitive to reveal within the social application 125. The user permissions 132 can also dictate how much trust to place in a user's choice to share the marker location. Whereas an executive can be allowed to post a link to a high security document, a mid-level employee can be blocked from posting the same. Even when a link to the document has been posted, only users who have authorization to access the document will be allowed to select the link and open the document or relevant document portion.

Document security levels can be assigned by the management server 130. In one example, document security levels can be different for different document types. For example, media files can default to a lower security level than a word processing document.

In another example, the content application 120 can send document context to the social application 125. The context can include a portion of the document that is associated with the marker placement. For example, text selected by or in proximity to the marker can be sent as part of the initiation of the conversation 145. In one example, when a conversation 145 is initiated in a document within the content application 120, context surrounding the marked location can be converted into an image. The context can be an entire page or a smaller portion, such as a paragraph surrounding the marked location. The content application 120 can determine whether to send the context or how much to send based on the document security level or user permissions 132.

The management server 130 or content application 120 can determine the level of context to provide in one example. This determination can be made based on the security level of the document and the permissions 132 of the user who placed the marker. If the permissions 132 indicate that the user is a high-level employee, such as an executive, the system 100 can favor supplying more context. If the document security level is high, the system 100 can favor supplying less context.

The scope of context provided can also depend on file type or the type of media selected with the marker 136. For example, if a marker 136 is placed on an image, the system 100 can default to using the full image as context. If the marker 136 is placed on text, the system can convert a portion of the text into an image for sharing in the social application 125.

In one example, the context includes a segment of video or audio when the marker 136 is placed within a media file. For example, a user might wish to discuss a feature discussed at the 10-minute point of a video. The user can mark this point in the video within the content application 120, creating a marker 136 there. The content application 120 can share a link to the marker with the social application 125. When a user within the social application 125 clicks the link, they can be taken to the 10-minute mark of the video within the content application 120.

Posting the context in the conversation 145 can allow participants to understand the conversation 145 without leaving the social application 125 or opening the content application 120 in one example.

The markers 136 can be stored at the management server 130 along with the documents 134. In one example, the markers 136 are not integrated into the code of the documents 134. Instead, the markers 136 can be independently stored in a database that allows users to search the markers 136 without parsing through documents 134. For example, users can search based on marker 136 creation date and context keywords. This can potentially lead to relevant conversations 145 in the social application 125. In another example, the markers 136 are integrated into the metadata of the documents. The documents 134 and markers 136 can remain secure and containerized.

In one example, the markers 136 are stored locally in a database of the content application 120 prior to storing the markers 136 at the management server 130. When the user device 110 connects to the management server 130 to synchronize, the markers 136 can be stored at the management server 130 for access by other users that access the documents 134. The other user devices can download the markers into their local content application 120 database, and the content application 120 can overlay the markers on the respective documents 134.

Conversations 145 can be separately stored by the conversation server 140. The conversations 145 need not be secure or containerized in an example. Each post in a thread can be stored with a conversation identifier so that the conversation server 140 or content application 120 can reassemble the conversation 145. Separate storage between documents, markers, and conversations 145 can retain document security in an example.

A marker 136 can identify a document 134 to which it belongs, and location information for where the marker 136 should be placed in the document 134. The marker 136 can also identify the conversation 145 to which it pertains in the social application 125, such as with a conversation identifier. The marker 136 can also identify the social application 125 in an example where the content application 120 is compatible with or allows selection between multiple different social applications 125. The marker 136 can also include conversation participants or user groups. Further, the marker 136 can include context, such as page text.

Users of the content application 120 can search creation dates and context keywords of markers 136 to identify relevant conversations 145. For example, if a user is unsure of the reasoning behind a feature described in a document 134, the user can search markers 136 using keywords of the description. From the identified markers 136, the user can link to the conversations 145 in those markers 136. Those conversations 145 can potentially provide insight into the feature.

In another example, the conversation 145 can begin at the social application 125. A user could post a comment with a link to a document 134 at the management server 130. The management server 130 or content application 120 on the user device 110 places a document-level marker 136 so that the conversation 145 remains with the document 134 and is not lost.

Figure 2:
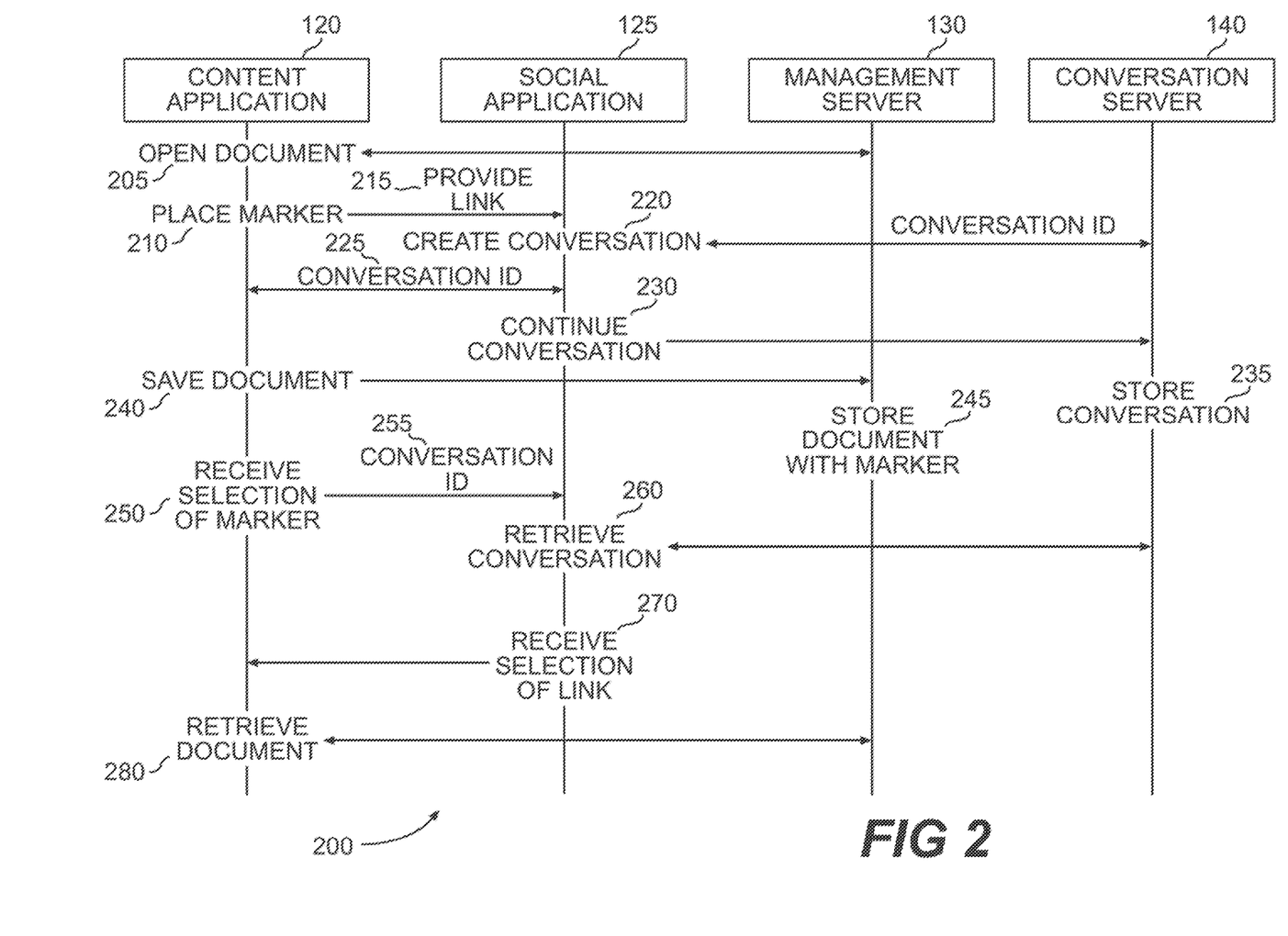
FIG. 2 is an exemplary method executed in a system.

FIG. 2 is an exemplary illustration of stages 200 performed in a system. At stage 205, the content application 120 can open a document 134. The content application 120 can display a list of available documents 134 from the management server 130. The management server 130 can provide the list based on the permissions 132 stored for the user. The management server 130 can also determine whether a document request is permitted or valid before routing the request to the appropriate repository so that the user device 110 can receive the document 134.

At stage 210, the content application 120, or the management server 130 in response to an instruction from the content application 120, can place a marker 136 within the document 134. The user can capture an area of the document 134 so that users will have context regarding what the conversation is about. The content application 120 can initiate a conversation with the social application 125. In one example, this can include providing the social application 125 with a link to the marker 136 at stage 215. This can allow the social application 125 to post the link within the conversation so that participants can retrieve the context or the entire document 134. Because the content application 120 can display the document from the management server 130 (rather than downloading a separate local copy for editing), the marker can be placed in or associated with documents in real time, allowing conversations to occur even as multiple users view and comment on the same document.

The link can be posted as part of creating the conversation at stage 220, making the link the top post in the conversation thread. Creation of the conversation can cause the conversation server 140 to assign a conversation identifier to the conversation and pass that back to the social application 125. The social application can then provide the conversation identifier to the content application 120 or management server 130 at stage 225. This conversation identifier can be stored as part of the marker 136 to allow reference to the conversation from within the content application 120.

At stage 230, the social application 125 can facilitate the conversation across multiple user devices 110. The user devices 110 can use the social application 125 to post messages to the conversation. These messages can be stored with the conversation identifier at the conversation server at stage 235.

When the user saves a document 134 at stage 240, the management server 130 can save both the document 134 and the associated markers 136 at stage 245. The markers 136 and documents 134 can be stored as separate files in one example. In another example, metadata in the documents 134 can identify the markers 136. Alternatively, the metadata in the markers 136 can identify the documents. So long as a link exists between the documents 134 and markers 136, the content application 120 can visually display the document 134 and markers 136 together. The document can be saved locally and synchronized with management server 130, or the user can view the document from the management server 130, allowing multiple users to simultaneously insert markers into the document.

When a user accesses the document 134 in the content application 120, the document 134 can include a visual indication of a marker 136. The marker 136 can be displayed to users who have the document open as the marker is created. The user can select the marker 136 at stage 250. The content application 120 can retrieve the conversation identifier from the marker 136 and forward the conversation identifier to the social application 125 at stage 255.

In one example, the social application 125 retrieves the conversation at stage 260. This can include forwarding the conversation identifier to the conversation server 140 to retrieve the conversation. The conversation server 140 can then supply the conversation thread. This can be displayed in a separate GUI for the social application 125 in one example. Alternatively, the content application can include a window for displaying the conversation as received from the social application 125.

Another user could open the conversation within the social application without being directed there from a marker 136. The social application 125 can receive a selection of the link at stage 270. In response, the content application 120 can attempt to retrieve the document at stage 280. This can include requesting permission from the management server 130. If the stored permissions permit it, the management server 130 can send the document to the content application 120 on the user device 110.

Figure 3:
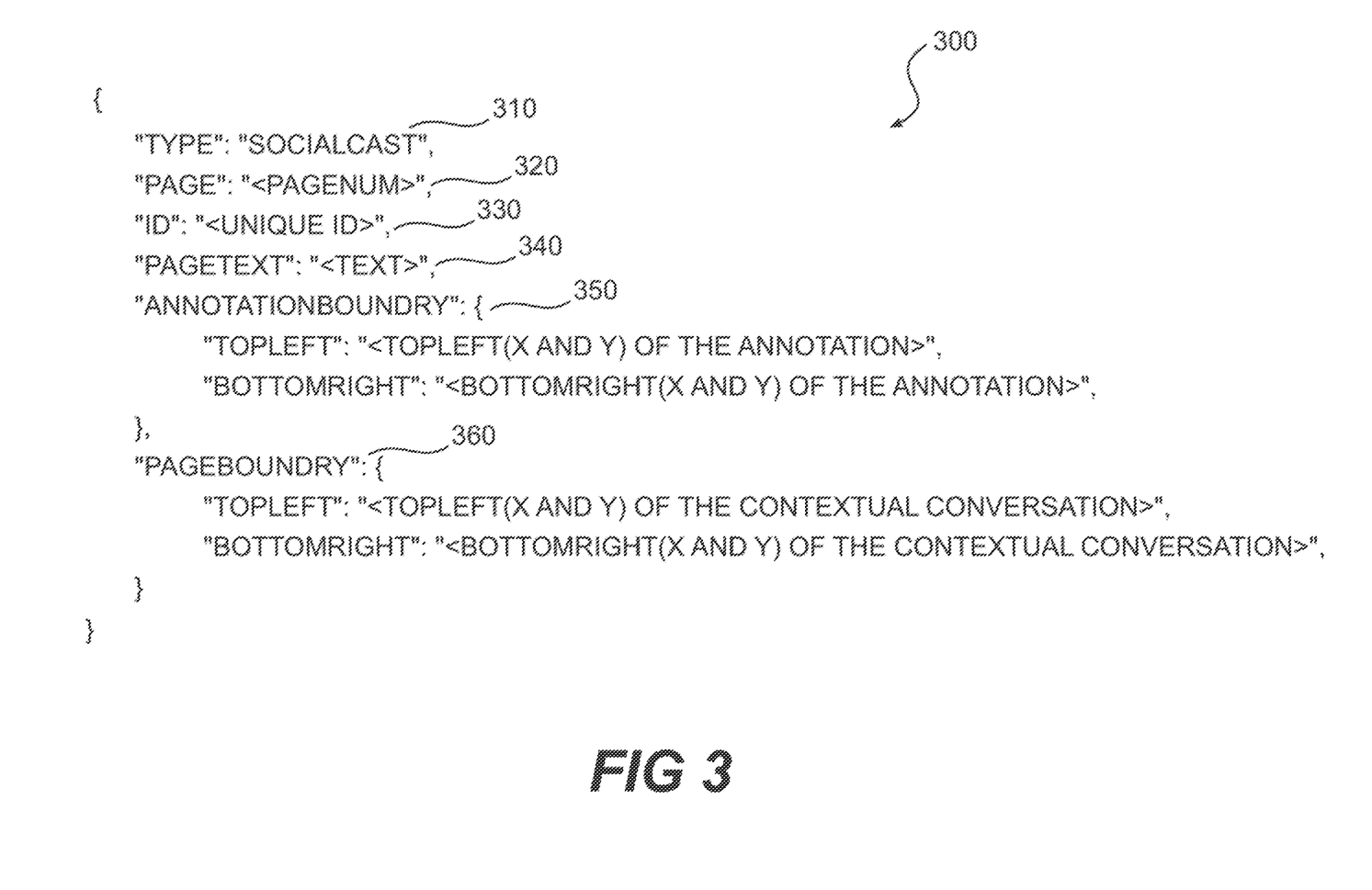
FIG. 3 is an exemplary illustration of a marker structure.

FIG. 3 is an exemplary illustration of a data structure of a marker 300. The marker 300 can identify a social application type 310. In this example, the social application type 310 is identified as SOCIALCAST. The content application 120 can be programmed to use different API commands for initiating or displaying conversations in different social application types 310. Based on the social application type 310 for the marker 300, the content application 120 can determine which social application 310 to call.

A conversation identifier 330 can identify which conversation applies to the marker 300. The conversation identifier 330 can be recognized and used by the social application 310 to retrieve the relevant conversation. The marker 300 can also or alternatively identify the document to which it pertains in an example.

The marker 300 can also include attributes that assist the content application 120 in appropriately determining the visual dimensions and context of the marker 300. In this example, the marker 300 can identify various portions of a document to which the marker 300 applies. For example, the page identifier 320 can specify which page of the document includes the marker 300. Page text 340 can indicate what text has been marked. Page text 340 can be used to contextually search markers 300 or to provide context within a conversation. An annotation boundary 350 can indicate coordinates and dimensions of a marker 300. Page boundary 360 can indicate coordinates and dimensions of context for a marker 300. The coordinates can be X and Y coordinates in one example. A viewer portion of the content application 120 can use these marker 300 attributes to determine image context to supply relative to the marker 300.

In one example, the marker 300 data structure can be stored as its own file, separate from the document. A manifest within the document or in a separate file can track which markers 300 apply to which documents. By separating markers 300 from the documents, the content application 120 can more efficiently search the markers 300 in one example. However, in another example, the marker 300 is stored within the metadata of the document itself.

In other examples, the marker 300 can use different fields for different document types. For example, a marker for a video file can include the time within the video to associate comments with.

Figure 4:
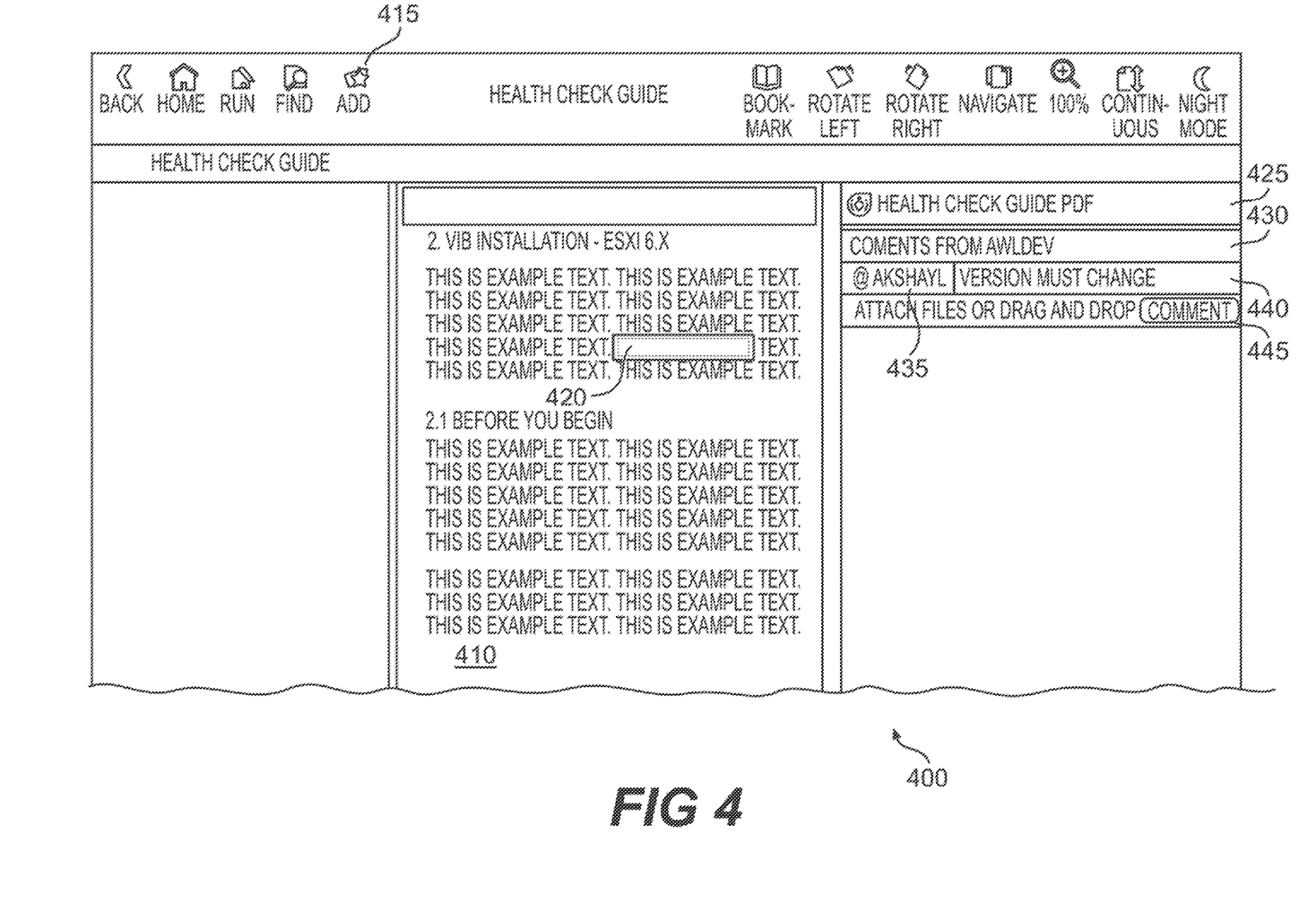
FIG. 4 is an exemplary illustration of a user interface.

FIG. 4 is an exemplary illustration of a GUI 400 that can be used in the content application 120. The GUI 400 can display a document 410. In this example, the document 410 is called "Health Check Guide." If the user wishes to discuss an aspect of the document 410, they can do so by selecting an option 415 to add a marker. After selecting the option 415, the user can place the marker by highlighting text or some other portion of the document 410. In this example, a marker 420 is placed within text of the document 410.

Placing the marker 420 causes the content application 120 (or social application 125) to open a conversation initiation window 425. The window can allow the user, in this example "AWLDEV" to provide initial comments 430 to start off the conversation. The GUI 400 can allow the user to identify at least one participant 435 in the initiation window 425. In this example, the user has identified "@AKSHAYL" as a participant 435 in the conversation. The GUI 400 also includes a field 440 for typing, recording, or dragging comment 430 content that will be part of the conversation. A comment button 445 allows the user to post their content and initiate the conversation.

To initiate the conversation, the content application 120 can send a message request to the social application 125. In one example, this occurs by sending the message to the conversation server 140. The conversation server 140 can notify participants of the conversation or place the conversation in a message feed. When the user accesses the social application 125, they can participate in the conversation.

Figure 5:
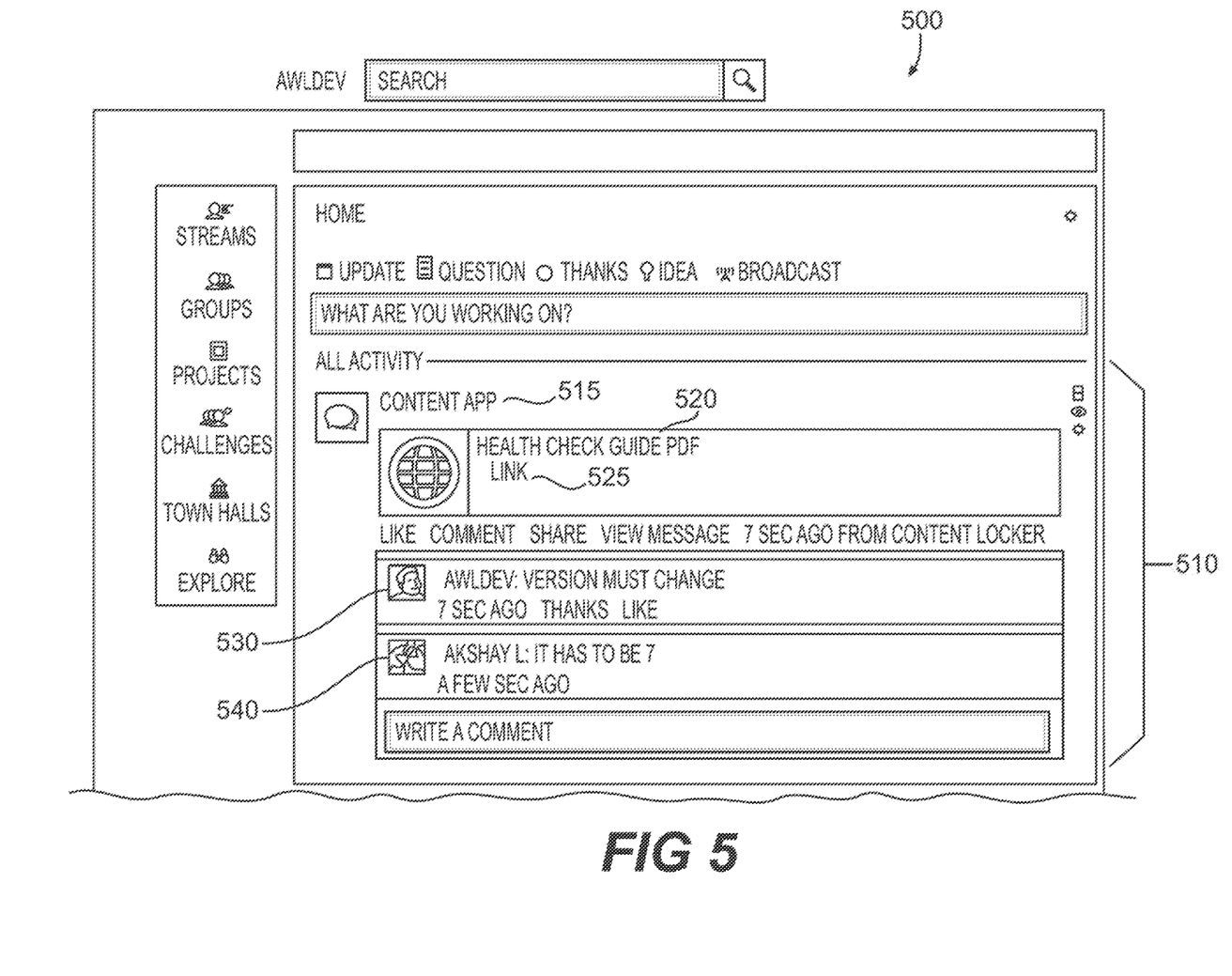
FIG. 5 is an exemplary illustration of a user interface.

FIG. 5 is an exemplary illustration of a GUI 500 of a social application 125. The social application 125 can operate separately from the content application 120. The GUI 500 can be a screen in an Internet browser in one example. In that instance, the social application 125 can be a website. In another example, the social application 125 can be part of a stand-alone application installed on the user device 110.

The conversation can be displayed as a thread 510 of comments in the social application 125 in one example. The thread 510 can include context 515 about what is being discussed. In this example, the context 515 includes identifying the content application 120, the name 520 of the document 410 being discussed, and a link 525 to the marker 420. In the example of FIG. 5, a first message 530 from AWLDEV (initially entered in field 440) begins the conversation. Because "@AKSHAYL" was identified as a participant in the conversation, a second message 540 in the thread 510 can be from @AKSHAYL.

Selecting the link 525 can cause the user device 110 to request the document 410 for display in the content application 120. The document can automatically open at the portion of the document corresponding to the marker and conversation. In one example, participants can continue to converse within the GUI 500 of the social application 125 while the document 410 opens in the content application 120. The content application 120 can request the document from the management server 130 in one example. Alternatively, the management server 130 can send a message to the management component 112 to cause the user device to open the content application 120.

In another example, selecting the link 525 can cause both the document 410 and the conversation thread 510 to display within the GUI 400 of the content application 120. This can ensure that the user can see both the conversation and the document 410 at the same time. In yet another example, the management component 112 of the user device can cause the content application 120 to display in one portion of the screen while the social application 125 displays in another.

Figure 6:
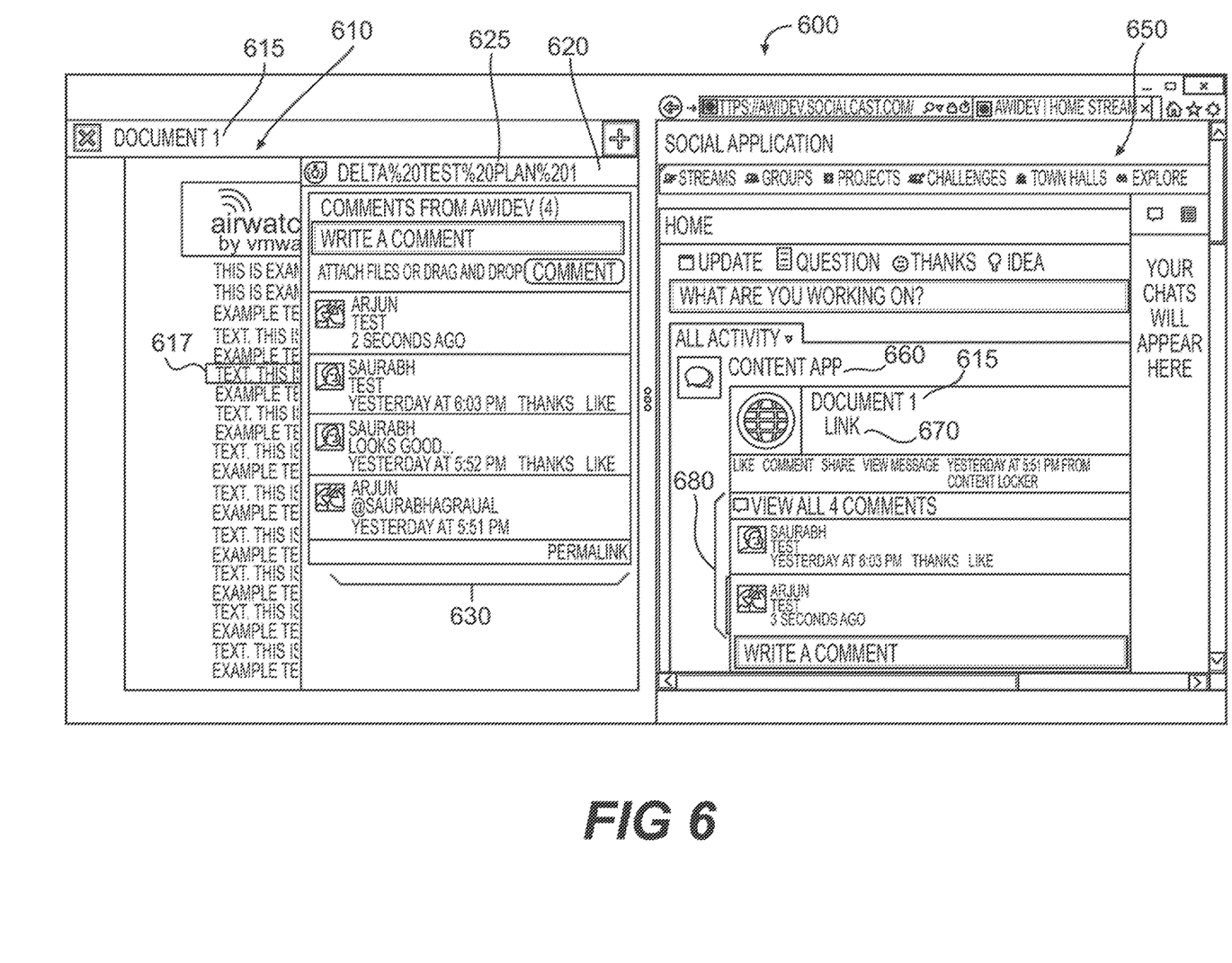
FIG. 6 is an exemplary illustration of a user interface.

FIG. 6 includes an example illustration of dual window usage on the same screen 600. The screen 600 of the user device 110 can display a first window 610 with the content application, which can be secure and containerized. In this example, a document 615 includes a marker 617 that references a conversation.

A second window 650 can display the social application 125, which can be a website. The conversation can be displayed in the second window 650. For context, the conversation can identify the content application 660, document 615, and provide a link 670 to the document 615. The conversation thread 680 can be displayed below this context.

The example of FIG. 6 also illustrates a way that the content application 120 can display the conversation within the content application 120. As shown, the content application 120 can open a conversation window 620 that is populated by the social application 125. The conversation thread 630 can display within the window 620 and the user can be afforded some of the interface features related to participating in the conversation. The content application 120 can request updates to the conversation from the social application 125 and send new messages to the social application 125. Alternatively, the social application 125 notifies the content application of any new comments as the comments are posted. The conversation window 620 can also include a link 625 to the conversation in the social application 125 in case the user wants to access the full interface of the social application 125.

If the social application 125 and content application 120 are both managed applications, then the conversation thread 630 can be communicated into the content application 120 through the management component 112. The management component 112 can pass messages received at the social application 125 to the content application 120 and vice versa.

Figure 7:
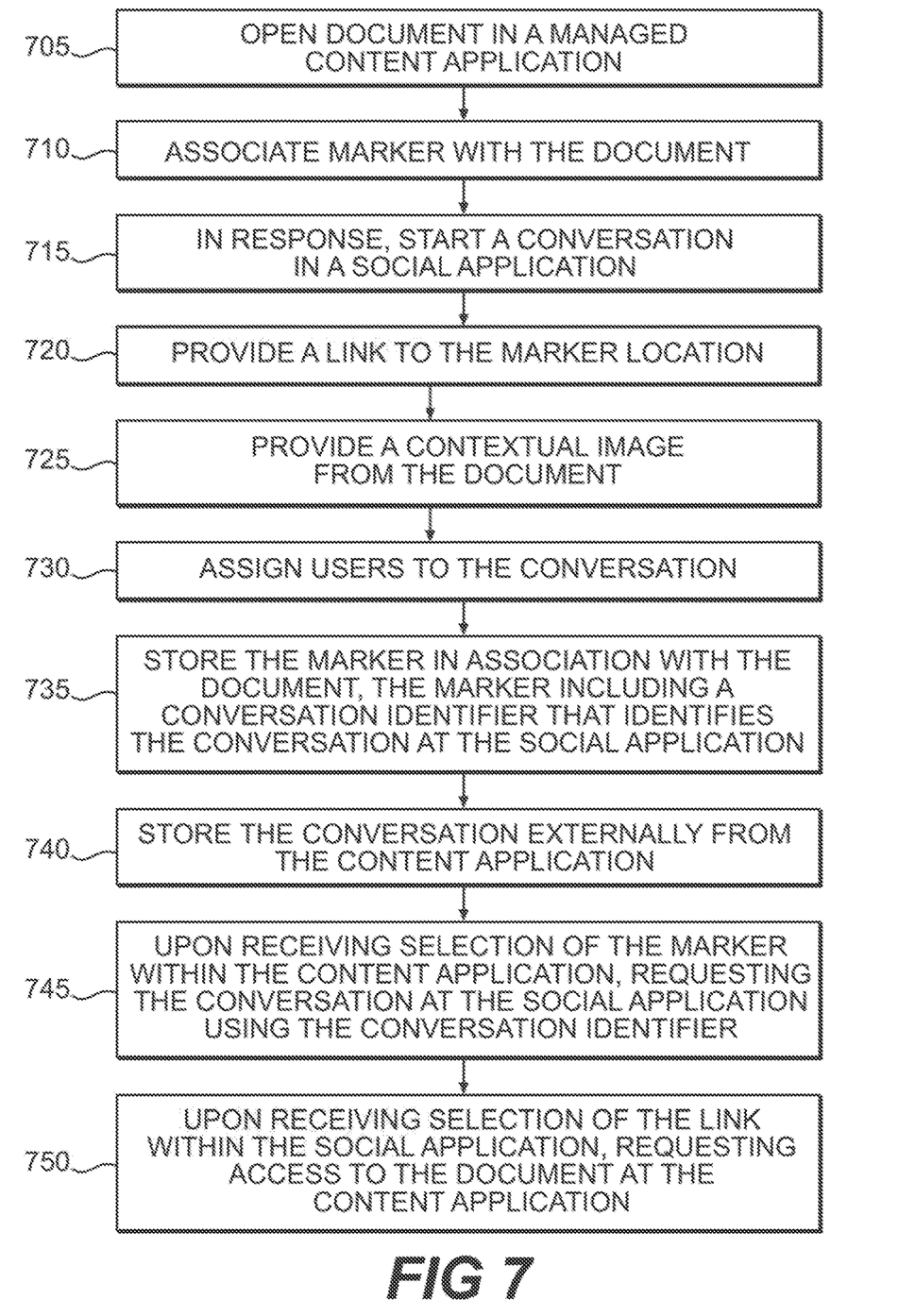
FIG. 7 is an exemplary method executed in a system.

FIG. 7 is an exemplary illustration of a method that a system can perform. At stage 705, the content application 120 can open a document. The content application 120 can associate a marker with the document by placing a marker within the document. In another example, a user can associate a marker with a document from a managed social application 125. The social application 125 can request available documents from the management server 130, and then mark an entire document for conversation.

In response, the social application 125 can begin a conversation at stage 715. Some or all of stages 720, 725, and 730 can be performed in some examples. The content application 120 can provide a link to the marker location at stage 720, which the social application 125 can include in the conversation. At stage 725, the content application 120, depending on user permissions 132 and document security levels, can post document context to the conversation in the social application 125.

At stage 730, the content application 120 can also assign participants to the conversation. For example, the user can type or select the user names of participants recognized by the social application 125. In another example, the user can select enterprise users as participants. The enterprise users can be tracked by the management server 130. The management server 130 can correlate the enterprise users with user names that are recognized by the social application 125, for example, at the conversation server 140. This can allow a user to select participants without having to know a separate user name for the enterprise users on the social application 125.

In one example, the social application 125 is a managed application. From within the content application 120 or the social application 125, the user can assign a user group to a private conversation. The management server 130 can manage which users belong to the user group, such that only the members of that group at any given time can view the conversation in the social application 125.

At stage 735, the marker can be stored in association with the document. This can be done by the management server 130 in one example. The document can be stored with a manifest that tracks all of the markers that belong to the document. The markers can be separately stored and searched by users of the content application 120 in an example. For example, users can search creation dates and context keywords of markers to identify relevant conversations. An administrative user or manager can additionally search markers by creation user to determine which enterprise employees are being most collaborative.

The marker can include a conversation identifier, which can be an address (such as a URL) to retrieve a conversation at the social application 125. The conversation identifier can alternatively be a code or number that the social application 125 can use to locate and retrieve the conversation.

At stage 740, the conversation server 140 can store conversations separately from the documents and markers. This can allow the content application 120 and its respective files, such as those at the management server 130, to remain secure and containerized even when using an outside and potentially unsecure social application 125 to discuss the enterprise documents.

At stage 745, the content application 120 can receive selection of a marker by the user. This can cause the content application 120 to request the conversation at the social application 125. The content application 120 can determine which social application 125 to contact based on information in the marker. The marker can include a conversation identifier, which can either be an address where the conversation is located or a code to supply to the conversation server 140 or social application 125 that can be used to retrieve the conversation.

At stage 750, the social application 125 can display a conversation that includes a link to a secure document. The link can cause the user device 110 to contact the management server 130 to request the document. The management server 130 can determine whether the user has the requisite permissions 132 to view or edit the document. Based on having the appropriate permissions, the management server 130 can grant access and the document can open in the content application 120.

Figure 8:
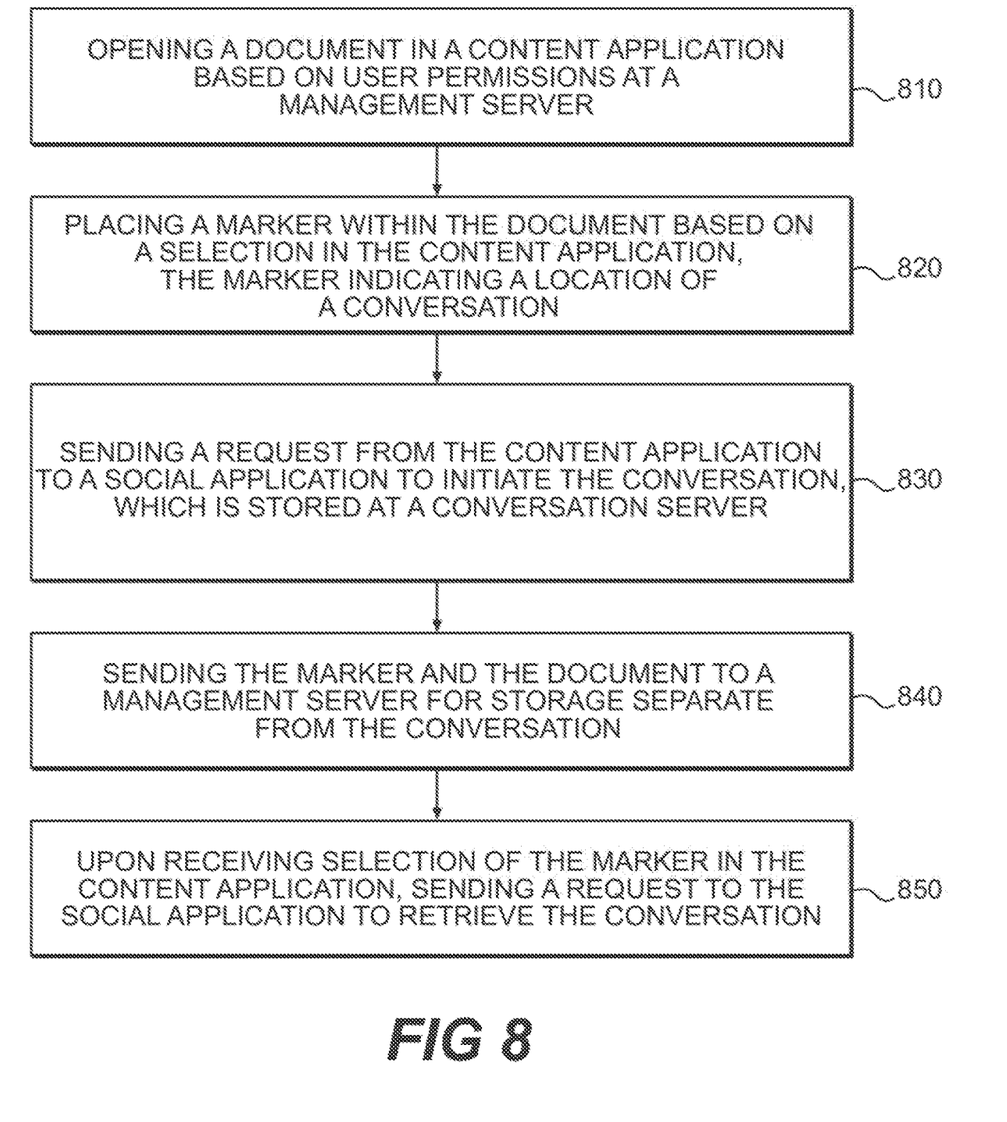
FIG. 8 is an exemplary method executed in a system.

FIG. 8 is an exemplary flow chart of stages performed on a user device 110 in a system. At stage 810, the user device 110 opens a secure document in the content application 120. The content application 120 can request the document from the management server 130. The management server 130 can determine whether the user has the needed permissions 132 to access the document before sending it. In another example, the user device 110 might already have an encrypted local copy. The document can be encrypted for use with the content application 120. In this way, the document can remain containerized when stored locally since it is only readable by the content application 120 or other managed applications.

At stage 820, the content application 120 can place a marker within the document. The user can select a region to mark, indicating a topic for conversation. The region can capture graphics, sound, video, or text. For example, marking sound or video can include capturing a portion of a media file on a timeline, or by holding down a button as the media plays to apply the marker over a duration.

The marker can indicate a location of the conversation. This location can include a social media application, and can include identification of the specific conversation. Therefore, indicating a location of the conversation can be accomplished with an address, such as a URL, or a reference to the social application 125 along with a code recognized by the social application 125 for retrieving the conversation.

Upon marker placement, at stage 830, the content application 120 can cause the social application 125 to initiate the conversation. The social application 125 can store the conversation at a conversation server 140. The conversation server 140 can be separate from the management server 130 in an example.

At stage 840, the marker and document can be stored at the management server 130. The marker can be stored separately or as part of the document. The document and marker can both be containerized by restricting their access to managed applications, such as the content application 120, in an example. In this manner, the marker and document can be stored separately from the non-containerized conversation.

At stage 850, based on selection of the marker, the content application 120 can send a request to the social application 125 to retrieve the conversation. In one example, the content application 120 sends a command to the social application 125 to retrieve the conversation. When the social application 125 is a website, this can include sending a URL that includes a conversation identifier used by the social application 125 to retrieve the conversation. In one example, the social application 125 can retrieve and send the unencrypted conversation to the content application 120 for simultaneous display with the encrypted document.

Figure 9:
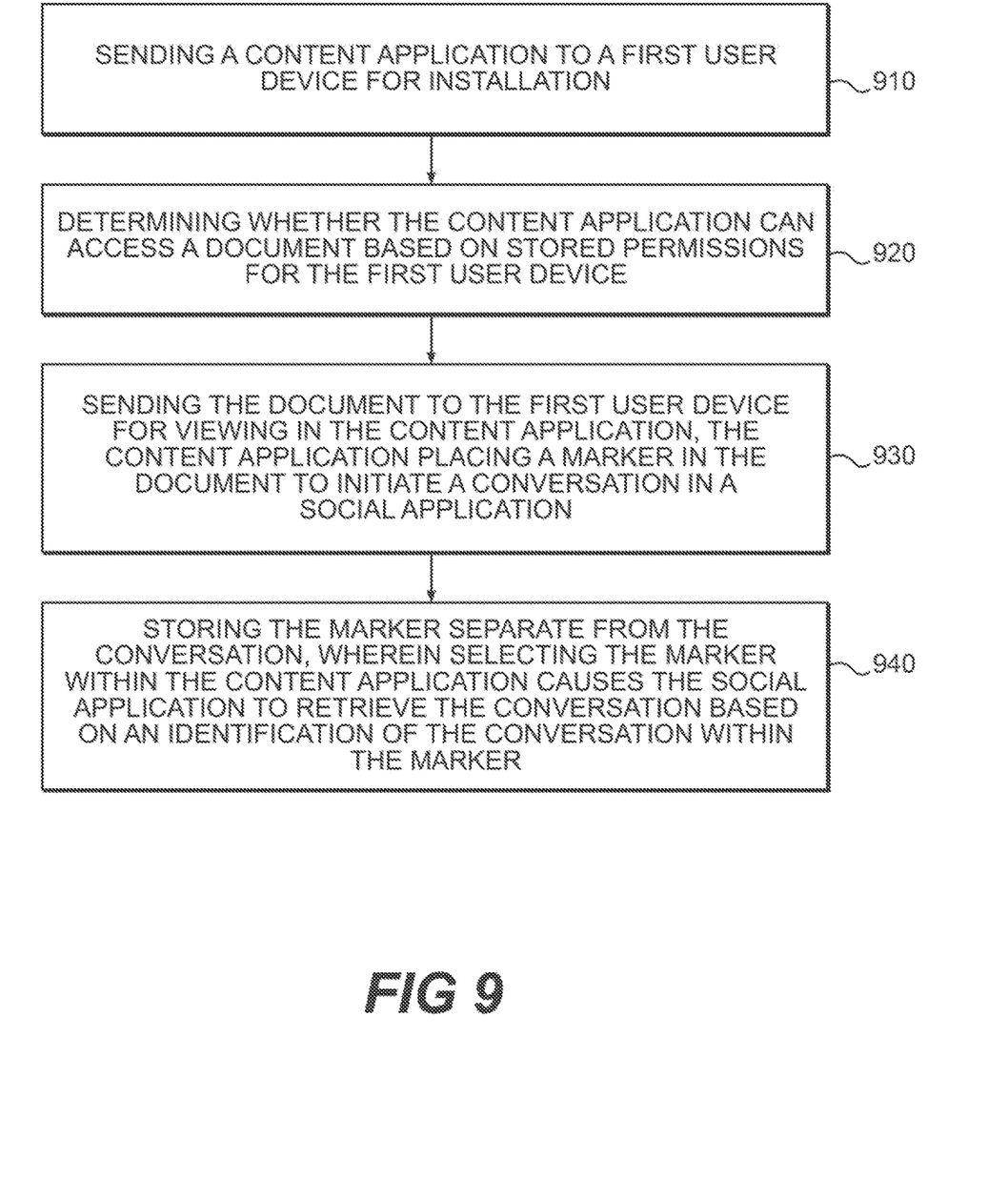
FIG. 9 is an exemplary method executed in a system.

FIG. 9 is an exemplary flow chart of stages performed by a management server 130. At stage 910, the management server 130 can send a content application 120 to a first user device for installation. This can be done as part of enrollment in an enterprise mobility management system. The content application 120 can be installed by the management server 130 through use of the management component 112 in one example.

At stage 920, the management server 130 can determine whether the content application can access a document. This can be done in response to the content application 120 requesting a list of available documents or requesting a specific document.

At stage 930, the management server can send the document to the first user device for viewing in the content application 120. The document can be encrypted for local storage on the first user device 110. The encryption can restrict document access to the content application 120 or other managed applications. The content application can allow the user to place a marker in the document, which also can be encrypted locally.

Placing the marker can cause the content application 120 to initiate a conversation in a social application 125. The conversation is not encrypted for containerized use, in one example. Instead, it can be available on the Internet or some other location where the social application 125 is accessible, and not confined to the content application 120 and management server 130.

At stage 940, the management server 130 can store the marker, which can remain containerized. The marker can be stored separately from the conversations at the conversation server. Selecting the marker within the conversation application 120 can cause the social application 125 to retrieve the conversation based on an identification within the marker. The identification can be an address of the conversation or an identification of the social application 125 along with an identification of the conversation that is specific to the marker.

Other examples of the disclosure will be apparent to those skilled in the art from consideration of the specification and practice of the examples disclosed herein. For example, the term "document" is not restrictive and encompasses every type of electronic file. The term "social application" can be any messaging or conversation platform that facilitates collaboration between users. The term "content application" can refer to one or more applications on the user device 110. For example, the "content application" can include a container that keeps documents encrypted and a separate viewer application for opening the documents and applying markers. These different components of the content application can be downloaded and installed together or separately, depending on the example.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A system for integrating real-time comments with managed documents, the system comprising:
   a non-transitory, computer-readable medium that contains instructions;
   a processor that executes the instructions to perform stages including:
      sending a content application, including a secured container, to a first user device for installation;
      determining whether the content application can access an encrypted document based on stored permissions at a management server for the first user device;
      viewing the document in the secured container at the first user device;
      placing a marker in the document, the marker associated with a portion of the document's contents, using the content application to initiate a conversation in a social application outside the secured container, wherein the conversation in the social application is not encrypted;
      determining, by the content application, an amount of context from the document associated with the marker to send to the social application, the amount of context based, at least in part, on a security level associated with the document;
      converting the context into an image and sending the image to the social application; and
      storing the marker separate from the conversation, wherein selecting the marker within the secured container causes the social application to retrieve the conversation stored outside the secured container based on an identification of the conversation within the marker.

2. The system of claim 1, wherein the content application provides the social application with a link to the marker for posting in the conversation.

3. The system of claim 1, wherein the content application places the marker in the document by receiving a user selection of an area within the document.

4. The system of claim 1, the stages further including determining whether a security level of the document permits the content application to share the image with the social application for inclusion in the conversation.

5. The system of claim 1, wherein the marker includes:
   information identifying the social application; and
   a conversation identifier that identifies the conversation at the social application.

6. The system of claim 1, wherein the content application displays the conversation from the social application with the document in the secured container, wherein the document is encrypted for use with the content application.

7. The system of claim 1, wherein, the content application provides an option to select a user group to converse within the social application regarding the document and wherein the stages further include determining whether a second user device can access the document based on whether the second user device belongs to the user group.

8. A non-transitory, computer-readable medium containing instructions executed by a processor to perform stages for integrating electronic comments with secure documents, the stages comprising:
   opening an encrypted document in a secured container of a content application based on user permissions at a management server, the document being encrypted for use with the content application;
   placing a marker within the document based on a selection in the content application, the marker associated with a portion of the document's contents, the marker causing a social application outside the secured container to begin a conversation about the document, wherein the conversation is stored at a conversation server outside the secured container that communicates with the social application, and wherein the conversation in the social application is not encrypted;
   storing the marker and the document at the management server, separately from the conversation;
   determining, by the content application, an amount of context from the document associated with the marker to send to the social application, the amount of context based, at least in part, on a security level associated with the document;
   converting the context into an image and sending the image to the social application; and
   upon receiving a selection of the marker in the secured container, sending a request to the social application to retrieve the conversation stored outside the secured container based on information in the marker.

9. The non-transitory, computer-readable medium of claim 8, wherein causing the social application to begin the conversation includes the content application providing an address to the document and identifying at least one conversation participant.

10. The non-transitory, computer-readable medium of claim 8, the stages further comprising displaying the conversation and the document simultaneously within the content application.

11. The non-transitory, computer-readable medium of claim 8, the stages further including sending the image from the content application to the social application for use in the conversation, based on the permissions at the management server.

12. The non-transitory, computer-readable medium of claim 8, wherein the marker includes:
   information identifying the social application; and
   a conversation identifier that identifies the conversation at the social application.

13. The non-transitory, computer-readable medium of claim 8, wherein the document is encrypted for use with the content application and is displayed in the content application simultaneously with the conversation.

14. The non-transitory, computer-readable medium of claim 8, the stages further including, in response to placing the marker, the content application allowing the user to identify a group within the social application that can access the conversation.

15. A method for integrating electronic comments with secure documents, comprising:
- opening an encrypted document in a secured container of a content application based on user permissions at a management server;
- associating a marker with the document based on a selection in the content application, the marker associated with a portion of the document's contents, the marker indicating a location of a conversation;
- sending a request from the content application to a social application outside the secured container to initiate the conversation, wherein the social application tracks comments made in the conversation and the conversation is stored at a conversation server outside the secured container for access by the social application, and wherein the conversation in the social application is not encrypted;
- determining, by the content application, an amount of context from the document associated with the marker to send to the social application, the amount of context based, at least in part, on a security level associated with the document;
- converting the context into an image and sending the image to the social application;
- sending the marker and the document to the management server for storage separately from the conversation; and
- upon receiving selection of the marker in the secured container, sending a request to the social application outside the secured container to retrieve the conversation.

16. The method of claim 15, wherein sending the request to the social application to launch the conversation includes sending a link to the marker and identifying at least one conversation participant.

17. The method of claim 15, further comprising displaying the conversation within the content application contemporaneously with the document.

18. The method of claim 15, wherein the marker indicates the location of the conversation by including:
- information identifying the social application; and
- a conversation identifier that the social application uses to identify the conversation.

19. The method of claim 15, wherein the document is encrypted for use with the content application and is displayed in the content application simultaneously with the conversation.

* * * * *